United States Patent
Tueshaus et al.

(10) Patent No.: US 11,933,027 B2
(45) Date of Patent: Mar. 19, 2024

(54) SANITARY FITTING HAVING A TWO-WAY VALVE

(71) Applicant: Grohe AG, Hemer (DE)

(72) Inventors: Jan Philipp Tueshaus, Hemer (DE); Waldemar Gaida, Düsseldorf (DE); Achim Mielke, Porta Westfalica (DE); Andreas Jung, Froendenberg (DE)

(73) Assignee: GROHE AG, Hemer (DE)

( * ) Notice: Subject to any disclaimer, the term of this patent is extended or adjusted under 35 U.S.C. 154(b) by 311 days.

(21) Appl. No.: 17/435,206

(22) PCT Filed: Feb. 28, 2020

(86) PCT No.: PCT/EP2020/055286
§ 371 (c)(1),
(2) Date: Aug. 31, 2021

(87) PCT Pub. No.: WO2020/182490
PCT Pub. Date: Sep. 17, 2020

(65) Prior Publication Data
US 2022/0145600 A1     May 12, 2022

(30) Foreign Application Priority Data
Mar. 8, 2019    (DE) .................. 10 2019 105 975.5

(51) Int. Cl.
*E03C 1/04*     (2006.01)
*F16K 11/052*   (2006.01)

(52) U.S. Cl.
CPC .......... *E03C 1/0405* (2013.01); *F16K 11/052* (2013.01); *E03C 2201/30* (2013.01)

(58) Field of Classification Search
CPC ..................................... E03C 1/0405
USPC .................................... 137/862, 871
See application file for complete search history.

(56) References Cited

U.S. PATENT DOCUMENTS 5,184,777 A  *  2/1993  Magnenat ............... E03C 1/084
                                                    239/447
5,813,436 A  *  9/1998  Chen .................... F16K 11/0445
                                                    4/677
5,937,905 A  *  8/1999  Santos ................... E03C 1/0404
                                                    4/677

FOREIGN PATENT DOCUMENTS

DE     1 193 752      5/1965
DE     1193752 B  *  5/1965  ............ F16K 11/052
DE     27 25 047     12/1978

OTHER PUBLICATIONS

DE 1197352 (Year: 1965).*

(Continued)

*Primary Examiner* — Lauren A Crane
(74) *Attorney, Agent, or Firm* — Wenderoth, Lind & Ponack, L.L.P.

(57) ABSTRACT

A sanitary fitting (1) that contains a fitting body (2), a first spray plate (3), a second spray plate (4), and a two-way valve (5), which can be used to selectively route a liquid to the first spray plate (3) or to the second spray plate (4), wherein the two-way valve (5) is arranged in the fitting body (2) and having a valve body (6), which is mounted rotatably about an axis of rotation (11) in a valve housing (25) of the two-way valve (5) between a first valve seat (7) of a first outlet (8) of the two-way valve (5) and a second valve seat (9) of a second outlet (10) of the two-way valve (5).

9 Claims, 3 Drawing Sheets

(56) References Cited

OTHER PUBLICATIONS

Figure 1:
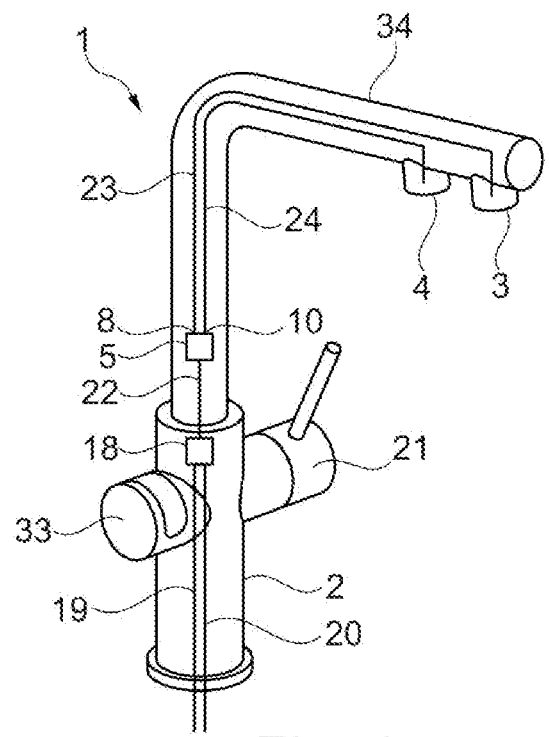

International Search Report dated May 18, 2020, in International (PCT) Application No. PCT/EP2020/055286, with English translation.

* cited by examiner

SANITARY FITTING HAVING A TWO-WAY VALVE

This invention relates to a sanitary fitting having a two-way valve. Such sanitary fittings are used, in particular, to provide a liquid on demand at washbasins, sinks, showers or bathtubs.

Sanitary fittings which can be used to dispense a liquid in different spray patterns, for instance in the form of rain spray, full-body spray, massage spray or pearl spray are known. The changeover between the individual spray patterns can be performed using manually actuable elements on the sanitary fittings, which, for instance, can be used to control valves in liquid channels of the sanitary fittings to route the liquid to a spray plate for the desired spray pattern. The known valves have a high installation space requirement, i.e., they either cannot be integrated into the sanitary fittings or the sanitary fittings have to be designed particularly large. This limits the design scope of the sanitary fittings and also increases their material requirements.

It is, therefore, the object of the invention to solve at least part of the problems described with reference to the prior art and, in particular, of providing a sanitary fitting whose valves have small installation space requirements.

This object is met by a sanitary fitting according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary fitting having at least the components listed below contributes to solving the problem:
- a fitting body,
- a first spray plate,
- a second spray plate, and
- a two-way valve, which can be used to selectively route a liquid to the first spray plate or to the second spray plate, wherein the two-way valve is arranged in the fitting body and having a valve body, which is mounted rotatably about an axis of rotation in a valve housing of the two-way valve between a first valve seat of a first outlet of the two-way valve and a second valve seat of a second outlet of the two-way valve.

The sanitary fitting is used in particular to supply liquids, such as water in particular, to sinks, washbasins, showers and/or bathtubs as required. For this purpose, in particular cold water at a cold-water temperature and hot water at a hot-water temperature can be routed to the sanitary fitting. The sanitary fitting can mix the cold water and hot water, in particular, for instance by means of a mixing valve or a (thermostatic) mixer, to form a mixed water having a desired mixed-water temperature. The cold-water temperature is in particular at most 25° C. (Celsius), preferably 1° C. to 25° C., particularly preferably 5° C. to 20° C. and/or the hot-water temperature is in particular at most 90° C., preferably 25° C. to 90° C., particularly preferably 55° C. to 65° C. The user can actuate the mixing valve or the (thermostatic) mixer by means of a first actuating element of the sanitary fitting, for instance in the manner of a lever, and/or can be arranged in a fitting body of the sanitary fitting. In particular, the fitting body is at least partially made of plastic and/or (cast) metal, such as brass. The fitting body can be attached to a support, such as a countertop, sink, washbasin, bathtub, or shower. Furthermore, the fitting body has a (protruding or branching) outlet that is rigidly or movably connected to the fitting body. The outlet can be made to be at least partially tubular and/or be part of the fitting body.

The liquid can be dispensed through the sanitary fitting in a plurality of spray patterns. For this purpose, the sanitary fitting has at least a first spray plate and a second spray plate. In particular, the sanitary fitting has only the first spray plate and the second spray plate to dispense the fluid in the first jet mode and/or the second jet mode. The spray patterns can be, for instance, rain spray, full-body spray, massage spray and or pearl spray. In particular, when the sanitary shower is used, the liquid can be dispensed either in a single spray mode or simultaneously in two different spray modes. The sanitary fitting can have one spray plate per spray pattern. The first spray plate and/or the second spray plate can have at least one nozzle and/or at least one outlet opening for the liquid, which can be used to form at least one spray jet of the liquid specific to the individual spray pattern.

To change the type of jet, the sanitary fitting has a two-way valve by means of which the liquid can be routed optionally to the first spray plate and/or the second spray plate. In particular, the two-way valve is at least partially arranged in the fitting body and/or the outlet of the fitting body of the sanitary fitting. Furthermore, the two-way valve has in particular an inlet for the liquid or the mixed water and two outlets. The inlet is connected to the mixing valve or the (thermostatic) mixer, in particular, in a fluid-conveying manner. The first outlet can be connected to the first spray plate via a first outlet line, and the second outlet can be connected to the second spray plate via a second outlet line, each in a fluid-conveying manner. The two-way valve can also be electrically actuated. For this purpose, the sanitary fitting can have a second actuating element, for instance in the form of a pushbutton, which can be used to change over the set spray pattern of the sanitary fitting. The second actuating element can be connected in a data-conducting manner to a controller of the sanitary fitting, which controller can be used to control an actuator of the two-way valve. The controller can comprise at least one microprocessor. The two-way valve can be actuated by means of the (electrically operated) actuator. The actuator may comprise at least one solenoid and/or at least one wire at least partially made of a shape memory alloy. Actuators having wires made of a shape memory alloy can be designed to be particularly small, which means that the installation space required can be further reduced. When the two-way valve is actuated, a valve body of the two-way valve is rotated about an axis of rotation in a valve body of the two-way valve between a first valve seat of the first outlet and a second valve seat of the second outlet. For this purpose, the valve body is rotatably mounted about the axis of rotation in the valve housing. The valve body can be rotated between the first valve seat and the second valve seat, for instance, at an angle of rotation of 10° to 180°, preferably 10° to 90°, particularly preferably 30° to 60° and most preferably 40 to 50°. When the valve body is rotated against the first valve seat, the first outlet is closed. If the valve body is rotated against the second valve seat, the second outlet is closed accordingly. When the valve body is in a rotational position between the first valve seat and the second valve seat, the first outlet and the second outlet are at least partially open. The valve body can be designed in the manner of a flap. In this way, the two-way valve may be formed particularly small and thus can be integrated into the fitting body or the outlet of the fitting body.

The valve body may have a first sealing surface for the first valve seat and a second sealing surface for the second valve seat. The first sealing surface is in particular that surface of the valve body that contacts the first valve seat when the valve body is rotated against the first valve seat. Accordingly, the second sealing surface is in particular that surface of the valve body that contacts the second valve seat when the valve body is rotated against the second valve seat.

The first sealing surface and the second sealing surface can extend in parallel to the axis of rotation of the valve body.

The first sealing surface and the second sealing surface can form a first angle.

The first angle can range from 10° to 170°. Preferably, the first angle is 30° to 120°, or more preferably 30° to 60°.

The first sealing surface may be disposed on a first valve body arm of the valve body, and the second sealing surface may be arranged at a second valve body arm of the valve body. The first valve body arm and/or the second valve body arm extend from the axis of rotation, in particular at least partially in a radial direction. The first sealing surface is oriented in particular in a first direction of rotation of the valve body and/or the second sealing surface is oriented in particular in a second direction of rotation of the valve body.

The first valve body arm and the second valve body arm may form a second angle. In particular, the second angle may be 10° to 170°, preferably 30° to 120°, or more preferably 30° to 60°.

The valve body can be V-shaped. In particular, the V-shape is formed by the first valve body arm and the second valve body arm. If the first sealing surface of the valve body is rotated against the first valve seat, the V-shape can hold the valve body against the first valve seat, in particular solely using the fluid pressure of the fluid flowing in via the inlet. If the second sealing surface of the valve body is rotated against the second valve seat, the V-shape can accordingly hold the valve body against the second valve seat, in particular solely using the fluid pressure of the fluid flowing in via the inlet. This can reduce the electrical energy required to actuate the two-way valve.

The axis of rotation may be located between the first outlet and the second outlet. In particular, the axis of rotation may be located between a first outlet channel of the first outlet and a second outlet channel of the second outlet.

The first outlet and the second outlet can extend in parallel to each other. In particular, the first outlet channel of the first outlet and the second outlet channel of the second outlet extend in parallel to each other inside the valve housing. In this way, the installation space requirement can be further reduced.

Figure 2:
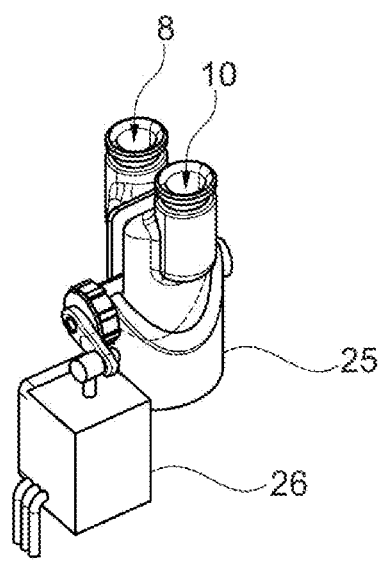
Figure 3:
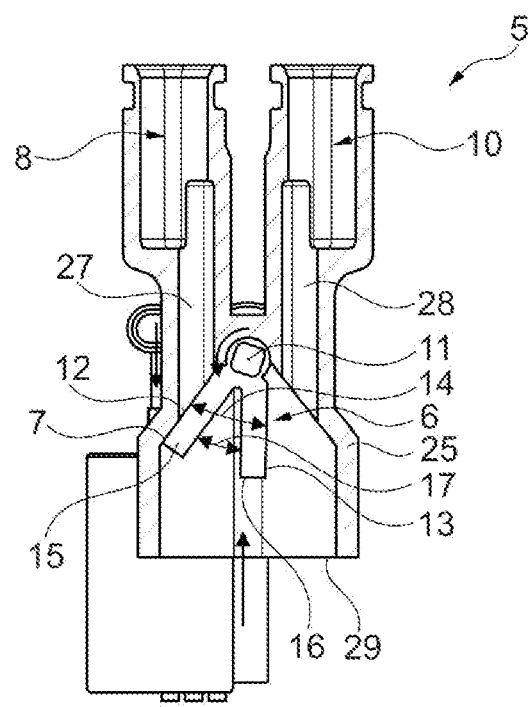
Figure 4:
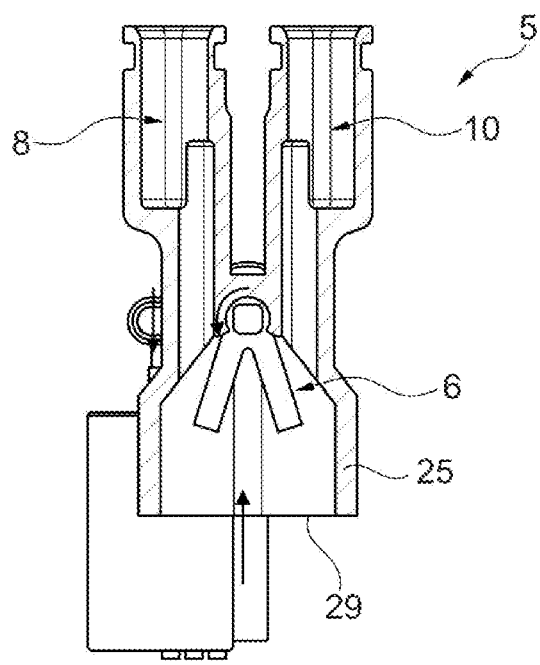
Figure 5:
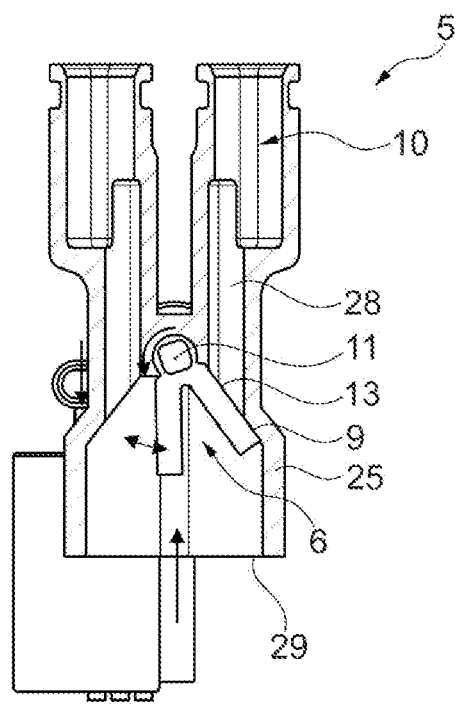

The invention and the technical environment are explained in more detail below with reference to the figures. It should be noted that the figures show a particularly preferred embodiment variant of the invention, but the invention is not limited thereto. The same reference signs are used for the same components in the figures. Shown in an exemplary and schematic manner are in:

FIG. 1 a sanitary fitting;

FIG. 2 a two-way valve of the sanitary fitting;

FIG. 3 a sectional view of the two-way valve in a first operating position;

FIG. 4 a sectional view of the two-way valve in a second operating position;

FIG. 5 a sectional view of the two-way valve in a third operating position; and

Figure 6:
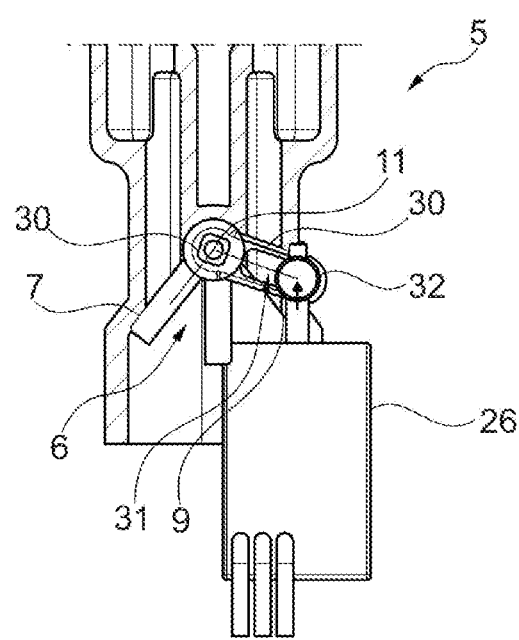

FIG. 6 the two-way valve in the first operating position with the actuator depicted.

FIG. 1 shows a sanitary fitting 1. The sanitary fitting 1 comprises a fitting body 2, the outlet 34 of which has a first spray plate 3 and a second spray plate 4. A mixing valve 18 is arranged in the fitting body 2, to which cold water at a cold-water temperature can be routed via a cold-water line 19 and to which hot water can be routed at a hot-water temperature via a hot-water line 20. The mixing valve 18 can be used to mix the cold water and the hot water can be mixed to form a mixed water having a desired mixed-water temperature. For actuating the mixing valve 18, the sanitary fitting 1 has a first actuating element 21, which is designed in the manner of a lever in this case. The actuating element 21 can be used to adjust the mixed-water temperature and a volume flow of the mixed water. The mixing valve 18 can be routed to a two-way valve 5 via a mixed-water channel 22. The two-way valve 5 can be used to route the mixed water optionally to the first spray plate 3 and/or the second spray plate 4. For this purpose, a first outlet 8 of the two-way valve 5 is connected to the first spray plate 3 via a first outlet line 23 and a second outlet 10 is connected to the second spray plate 4 via a second outlet line 24. The sanitary fitting 1 has a second actuating element 33 for actuating the two-way valve 5, which is designed in the manner of a pushbutton in this case. The second actuating element 33 may be connected in a data-conducting manner to a control system of an actuator 26 shown in FIGS. 2 and 6, which is not shown here.

FIG. 2 shows a perspective view of the two-way valve 5. The two-way valve 5 comprises a valve body 25 including the first outlet 8 and the second outlet 10. A valve body 6, not shown here, is arranged in the valve housing 25 and is rotatably mounted by an actuator 26 about an axis of rotation 11, also not shown here.

FIG. 3 shows a sectional view the two-way valve 5 in a first operating position. The valve body 6 is shown arranged in the valve housing 25. The valve body 6 has a first valve body arm 15 having a first sealing surface 12 and a second valve body arm 16 having a second sealing surface 13. The first sealing surface 12 and the second sealing surface 13 form a first angle 14, which in this case is (approximately) 45°. In addition, the first valve body arm 15 and the second valve body arm 16 form a second angle 17, which is also (approximately) 45° in this case. The valve body 6 is therefore V-shaped. In the first operating position shown here, the valve body 6 is rotated about the axis of rotation 11 (clockwise) against a first valve seat 7 of the first outlet 8, such that the first sealing surface 12 closes a first outlet channel 27 of the first outlet 8. The valve housing 25 of the two-way valve 5 has an inlet 29, which can be connected to the mixed-water channel 22 shown in FIG. 1, i.e. the mixed water can flow into the valve housing 25 via the inlet 29. However, because the first outlet 8 is closed, the liquid can only leave the two-way valve 5 via a second outlet channel 28 of the second outlet 10, such that in the first operating position of the two-way valve 5, the mixed water can be routed to the second spray plate 4 via the second outlet line 24 shown in FIG. 1. The first outlet 8 and the second outlet 10 are mirror images of each other, i.e., the first outlet channel 1 of the first outlet 8 and the second outlet channel 28 of the second outlet 10 extend in parallel to each other. The axis of rotation 11 is arranged between the first outlet 8 and the second outlet 10 or between the first outlet channel 27 and the second outlet channel 28.

FIG. 4 shows a second operating position of the two-way valve 5. In the second operating position, the valve body 6 is in a center position, in which the valve body 6 closes neither the first outlet 8 nor the second outlet 10. In this way, the mixed water flowing to the valve body 25 via the inlet 29 can exit the two-way valve 5 via both the first outlet 8 and the second outlet 10. Thus, the mixed water is routed to both the first spray plate 3 and the second spray plate 4 via the first outlet line 23 and the second outlet line 24 shown in FIG. 1.

FIG. 5 shows a third operating position of the two-way valve 5. In the third operating position, the valve body 6 was rotated counterclockwise against a second valve seat 9 of the second outlet 10 such that the second sealing surface 13 closes the second outlet channel 28 of the second outlet 10. As a result, the mixed water flowing to the valve body 25 via the inlet 29 can only exit the two-way valve 5 via the first outlet 8. Thus, in the third operating position of the two-way valve 5, the mixed water can be routed (only) to the first spray plate 3 via the first outlet line 23 shown in FIG. 1.

FIG. 6 shows a sectional view of the two-way valve 5 in the first operating position with the actuator 26. The valve body 6 has a valve body axis 30, with which the valve body 6 can rotate about the axis of rotation 11. The valve body axis 30 is connected non-rotatably to a rotary lever 30, which has a link 31. A sliding block 32 of the actuator 26 engages with the link 31 such that the valve body 6 can be rotated by the actuator 26 between the first valve seat 7 and the second valve seat 9.

In particular, this invention makes for a particularly compact design of a sanitary fitting.

LIST OF REFERENCE NUMERALS

1 Sanitary fitting
2 Fitting body
3 First spray plate
4 Second spray plate
5 Two-way valve
6 Valve body
7 First valve seat
8 First outlet
9 Second valve seat
10 Second outlet
11 Axis of rotation
12 First sealing surface
13 Second sealing surface
14 First angle
15 First valve body arm
16 Second valve body arm
17 Second angle
18 Mixing valve
19 Cold water line
20 Hot water line
21 First actuating element
22 Mixed-water channel
23 First outlet line
24 Second outlet line
25 Valve body
26 Actuator
27 First outlet channel
28 Second outlet channel
29 Inlet
30 Valve body
31 Link
32 Link block
33 Second actuating element
34 Outlet

The invention claimed is:

1. A sanitary fitting (1) comprising:
a fitting body (2),
a first spray plate (3),
a second spray plate (4), and
a two-way valve (5), which can be used to selectively route a liquid to the first spray plate (3) or to the second spray plate (4),
wherein the two-way valve (5) is arranged in the fitting body (2) and has a valve body (6), which is mounted rotatably about an axis of rotation (11) in a valve housing (25) of the two-way valve (5) between a first valve seat (7) of a first outlet (8) of the two-way valve (5) and a second valve seat (9) of a second outlet (10) of the two-way valve (5), and
wherein the valve body (6) is V-shaped,
wherein the V-shape is formed by a first valve body arm (15) of the valve body (6) and a second valve body arm (16) of the valve body (6), and
wherein the first valve body arm (15) and the second valve body arm (16) extend from the axis of rotation (11) in a radial direction towards an inlet (29) of the valve housing (25).

2. The sanitary fitting (1) according to claim 1, wherein the valve body (6) has a first sealing surface (12) for the first valve seat (7) and a second sealing surface (13) for the second valve seat (9).

3. The sanitary fitting (1) according to claim 2, wherein the first sealing surface (12) and the second sealing surface (13) extend in parallel to the axis of rotation (11) of the valve body (6).

4. The sanitary fitting (1) according to claim 2, wherein the first sealing surface (12) and the second sealing surface (13) form a first angle (14).

5. The sanitary fitting (1) according to claim 4, wherein the first angle (14) is 10° to 170°.

6. The sanitary fitting (1) according to claim 2, wherein the first sealing surface (12) is arranged at the first valve body arm (15) of the valve body (6) and the second sealing surface (13) is arranged at the second valve body arm (16) of the valve body (6).

7. The sanitary fitting (1) according to claim 6, wherein the first valve body arm (15) and the second valve body arm (16) form a second angle (17).

8. The sanitary fitting (1) according to claim 1, wherein the axis of rotation (11) is arranged between the first outlet (8) and the second outlet (10).

9. The sanitary fitting (1) according to claim 1, wherein the first outlet (8) and the second outlet (10) extend in parallel to each other.

* * * * *